(12) United States Patent
Taite et al.

(10) Patent No.: US 10,080,201 B2
(45) Date of Patent: Sep. 18, 2018

(54) TECHNOLOGIES FOR CONTROLLING MOBILE COMMUNICATION DEVICES FOR LOW RECEPTION AREAS

(71) Applicant: Intel Corporation, Santa Clara, CA (US)

(72) Inventors: Shahar Taite, Kfar Saba (IL); Igor Ljubuncic, Yokneam Ilit (IL); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 14/671,743

(22) Filed: Mar. 27, 2015

(65) Prior Publication Data
US 2016/0286501 A1 Sep. 29, 2016

(51) Int. Cl.
*H04W 52/24* (2009.01)
*H04W 4/12* (2009.01)
*H04W 4/02* (2018.01)
*H04W 52/28* (2009.01)

(52) U.S. Cl.
CPC ......... *H04W 52/245* (2013.01); *H04W 4/025* (2013.01); *H04W 4/12* (2013.01); *H04W 52/285* (2013.01); *H04W 52/283* (2013.01)

(58) Field of Classification Search
CPC . H04W 52/245; H04W 52/04; H04W 52/146; H04W 52/283; H04W 52/285
See application file for complete search history.

(56) References Cited

U.S. PATENT DOCUMENTS

| 8,433,934 | B1* | 4/2013 | On | H04W 52/0245 370/311 |
|---|---|---|---|---|
| 2002/0115465 | A1* | 8/2002 | Komatsu | H04W 52/283 455/522 |
| 2011/0050503 | A1 | 4/2011 | Fong | |
| 2012/0274509 | A1 | 11/2012 | Tsai | |
| 2013/0051263 | A1* | 2/2013 | Watanabe | H04W 36/30 370/252 |
| 2013/0155842 | A1* | 6/2013 | Moore | H04W 76/027 370/221 |
| 2014/0013136 | A1 | 1/2014 | Dadu | |
| 2014/0179337 | A1 | 6/2014 | Alpert | |
| 2014/0336960 | A1 | 11/2014 | Haghighat-Kashani et al. | |

OTHER PUBLICATIONS

International Search Report for PCT/US16/019794, dated May 31, 2016 (3 pages).
Written Opinion for PCT/US16/019794, dated May 31, 2016 (6 pages).

\* cited by examiner

*Primary Examiner* — Derrick Ferris
*Assistant Examiner* — Kevin Lee
(74) *Attorney, Agent, or Firm* — Barnes & Thornburg LLP

(57) ABSTRACT

Technologies for controlling mobile communication devices in a low reception area includes predicting a future location of the mobile communication device and determining reception data for the predicted future location. The reception data is indicative of an expected level of reception by the mobile communication device while in the future location. Transmission power of a communication circuit of the mobile communication device may be reduced in response to a determination that the expected level of reception is less than a reference threshold.

22 Claims, 5 Drawing Sheets

TECHNOLOGIES FOR CONTROLLING MOBILE COMMUNICATION DEVICES FOR LOW RECEPTION AREAS

BACKGROUND

Mobile communication devices, such as smartphones, tablet computers, and laptops, are quickly becoming ubiquitous tools for the average user. In fact, many users maintain quick access to their mobile communication devices nearly at all times. For example, users often keep their mobile communication device on their person or inside their vehicle within easy reach. As the user travels about, the mobile communication device provides a mechanism for near constant contact with the user.

Unfortunately, communication coverage is not uniform, and there exist pockets of low or near zero reception in which mobile communication devices cannot receive a strong enough signal to properly communicate (e.g., via cellular or data communications). Regardless, the communication circuits of many mobile communication devices are configured to continually search for suitable reception. For example, a smartphone or cellular phone will typically continually search for the nearest cellular tower even in a low/zero reception area. To improve the chances of establishing a connection in such low reception areas, many mobile communication devices are configured to increase the transmission power of the associated communication circuit. The mobile communication devices may increase the power of the communication circuit even though no successful connection is obtainable in the present area. However, such power increases can likewise increase the power consumption of the power source of the communication circuit (e.g., battery), which may drain the power source of its energy. Additionally, the increased transmission power of the communication circuit increases the ionizing radiation emitting from the mobile communication device, which may be harmful or otherwise undesirable to the user over extended periods of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
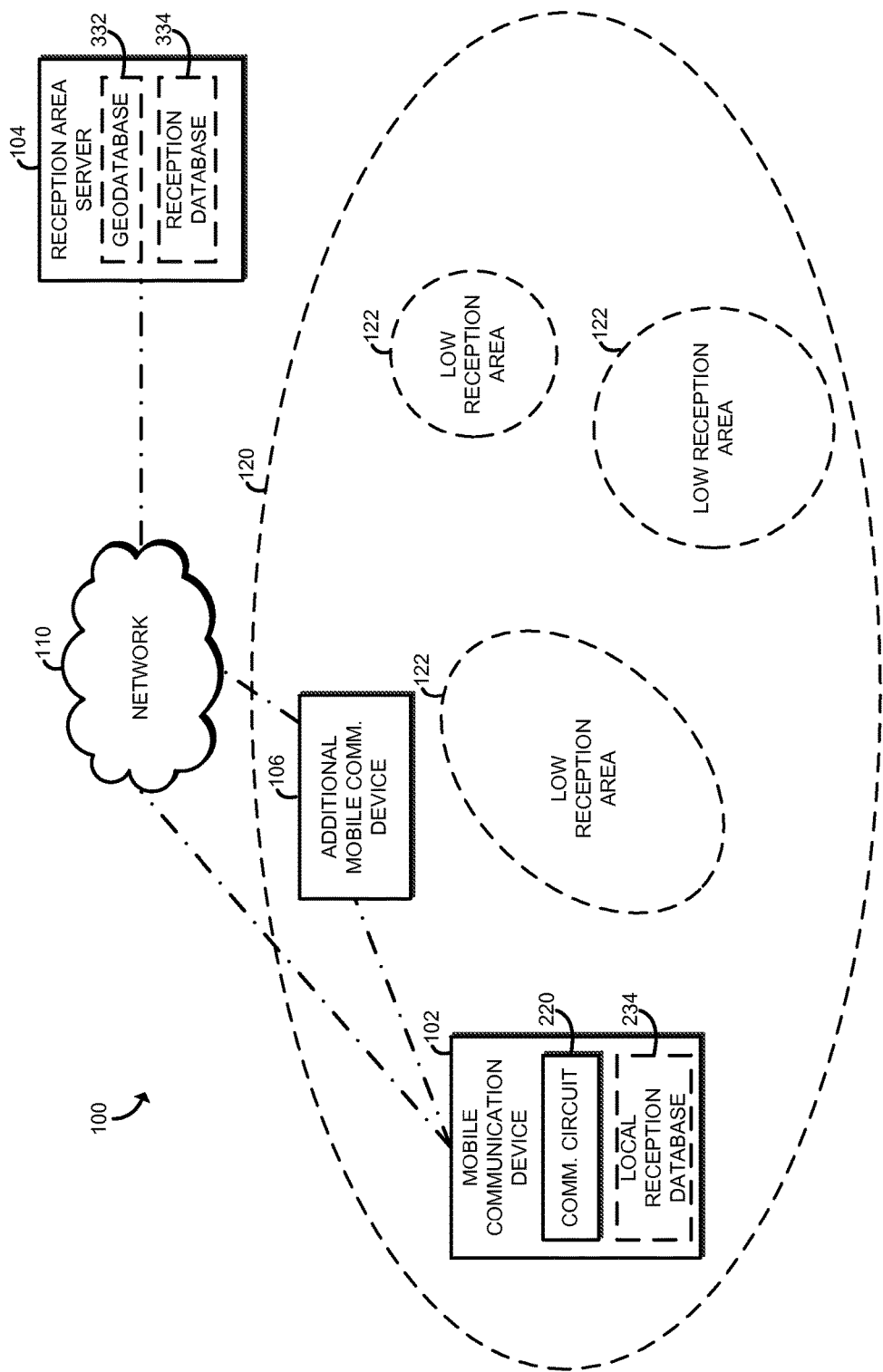
FIG. 1 is a simplified block diagram of at least one embodiment of a system for controlling transmission power of a mobile computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for controlling transmission power of mobile computing devices in low reception areas includes a mobile communication device 102 and a reception area server 104 in communication with each other over a network 110. In use, a user of the mobile communication device 102 may traverse a local area 120 having one or more low reception areas 122 in which the mobile communication device 102 is unable to properly communicate (e.g., voice or data communications). As discussed in more detail below, the mobile communication device 102 is configured to predict a future location of the mobile communication device 102 and determine whether such predicted future location is within a low reception area 122. If so, the mobile communication device 102 is configured to reduce the transmission power of a communication circuit 220 of the mobile communication device 102 to reduce power consumption and radiation exposure of the user in those areas in which communication is not possible due to low reception (e.g., low reception areas 122). For example, in some embodiments, the mobile communication device 102 may be configured to turn off or otherwise remove power from the communication circuit 220 in the low reception areas 122. If the user leaves the low reception area 122, the mobile communication device 102 turns the communication circuit 220 back on to facilitate communications again.

In some embodiments, the mobile communication device 102 may notify the user of the mobile communication device 102 that user is about to enter a low reception area and that the communication circuit 220 will be disabled or otherwise turned off. If the user is on an active call or communication with another mobile communication device, the mobile communication device 102 may also notify a user of that other mobile communication device that the current communication link will be lost or disconnected.

As discussed in more detail below, the mobile communication device 102 may determine the location of the low reception areas 122 by retrieving reception data for the predicted future location from the reception area server 104. In some embodiments, the reception area server 104 may maintain a geodatabase 332, which maps the low reception areas 122 of the local area 120. Additionally or alternatively, the reception area server 104 may maintain a reception database 334 including reception data for identified low reception areas 122, which may be generated based on crowdsourced data received from other mobile communication devices or pre-established based on monitored historical or test-generated data. Regardless, the reception data maintained by the reception area server 104 provides an indication of the expected level of reception for the mobile communication device 102 in the various low reception areas 122. In some embodiments, the reception data stored by the reception area server 104 may be indexed or retrieved based on operational parameters of the mobile communication device 102, in addition to the predicted future location. For example, the location of the low reception areas 122 may be dependent on the type of mobile communication device 102, the communication protocol used, the communication service provider used by the mobile communication device 102, and/or other aspects or characteristics of the mobile communication device 102 and/or its operation.

In some embodiments, the mobile communication device 102 may retrieve the reception data from a local reception database 234 maintained by the mobile communication device 102, rather than from the reception area server 104. The local reception database 234, however, may be embodied as a subset of the reception database 334 maintained by the reception area server 104 or otherwise obtained from the reception area server 104. For example, the mobile communication device 102 may download the local reception database 234 for the local area 120 when entering that local area 120 and download a local reception database 234 for another area when entering that other area. Additionally, in some embodiments, the mobile communication device 102 may be configured to obtain the reception data directly from an additional mobile communication device 106, which may be located in the local area 120 or may have traversed that area 120 previously. For example, each of the mobile communication devices 102, 106 may employ a software application to facilitate transfer of reception data with each other when located within proximity to each other. In that way, reception data may propagate from one mobile communication device 102 to another.

Figure 2:
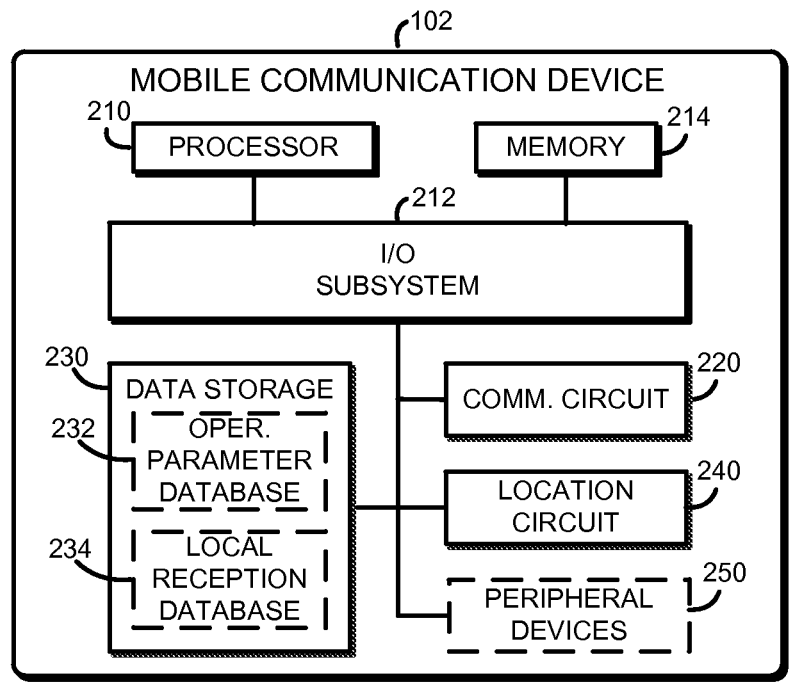
FIG. 2 is a simplified block diagram of at least one embodiment of the mobile computing device of the system of FIG. 1.

Referring now to FIG. 2, the mobile communication device 102 may be embodied as any type of mobile computing device capable of wireless communication and performing the functions described herein. For example, the mobile communication device 102 may be embodied as or otherwise include, without limitation, a smartphone, a cellular phone, a tablet computer, a notebook computer, a laptop computer, a wearable computer, smart eyeglasses, a smart watch, a head-mounted display unit, a handset, a messaging device, a multiprocessor system, a processor-based system, a consumer electronic device, and/or any other computing device capable of wireless communication. As shown in FIG. 2, the illustrative mobile communication device 102 includes a processor 210, an I/O subsystem 212, a memory 214, a communication circuit 220, a data storage 230, and a location circuit 240. Of course, the mobile communication device 102 may include other or additional components, such as those commonly found in a mobile computer (e.g., various input/output devices), in other embodiments. Additionally, in some embodiments, one or more of the illustrative components may be incorporated in, or otherwise form a portion of, another component. For example, the memory 214, or portions thereof, may be incorporated in the processor 210 in some embodiments The processor 210 may be embodied as any type of processor capable of performing the functions described herein. For example, the processor 210 may be embodied as a single or multi-core processor(s), a single or multi-socket processor, a digital signal processor, a microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the mobile communication device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the mobile communication device 102. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the mobile communication device 102, on a single integrated circuit chip.

The communication circuit 220 may be embodied as any communication circuit, device, or collection thereof, capable of enabling communications between the mobile communication device 102 and other devices. To do so, the communication circuit 220 may be configured to use any one or more communication technology and associated protocols (e.g., Ethernet, Bluetooth®, Wi-Fi®, WiMAX, etc.) to effect such communication. In the illustrative embodiment, the communication circuit 220 includes a power source that may be interrupted or removed so as to turn off or power down the communication circuit 220, or portions thereof, to reduce the power consumption of the communication circuit 220, and associated radiation, when the mobile communication device 102 is in a low reception area 122. For example, in some embodiments, a transmitter circuit of the communication circuit 220 may be configured to turn off in response to a corresponding command signal.

The data storage 230 may be embodied as any type of device or devices configured for the short-term or long-term storage of data. For example, the data storage 230 may include any one or more memory devices and circuits, memory cards, hard disk drives, solid-state drives, or other data storage devices. In the illustrative embodiments, the data storage 230 may store an operational parameter database 232. The operational parameter database 232 may store data indicative of various operational parameters of the mobile communication device 102. The operational parameters may be embodied as, or otherwise include, any type of parameter or characteristic associated with the mobile communicating device 102 usable to determine an expected level of reception in an area. For example, the operational parameters may include, but are not limited to, the altitude of the mobile communication device 102, an identifier associated with the mobile communication device 102 (e.g., an Internet Protocol address, an Electronic Serial Number, an International Mobile Station Equipment Identity, a Mobile Equipment Identifier, etc.), an identity of a communication service provider (e.g., a cellular carrier, Internet service provider, etc.) used by the mobile communication device 102, a communication protocol (e.g., Global System for Mobile Communications protocol, Code Division Multiple Access protocol, etc.) used by the mobile communication device 102, a communication service package associated with the mobile communication device 102 and provided by a communication service provider, a device type of the mobile communication device 102, an antenna type of an antenna of the communication circuit 220 of the mobile communication device 102, the number of additional mobile communication devices 106 within a reference distance of the mobile communication device 102, environmental conditions of a local environment of the mobile communication devices, and/or other parameters, characteristics, or aspects of the mobile communication device 102 or its operation.

The data storage 230 may also store the local reception database 234. As discussed above, the local reception database 234 may store reception data, which provides an indication of the expected level of reception for the mobile communication device 102 in the various low reception areas 122. In some embodiments, the reception data stored in the local reception database 234 may be indexed or retrieved based on the operational parameters of the mobile communication device 102 in addition to the predicted future location. Additionally, as discussed above, the local reception database 234 may be embodied as a subset of the reception database 334 maintained by the reception area server 104. Of course, the local reception database 234 may also be supplemented by reception data received from one or more additional mobile communication devices 106.

The location circuit 240 may be embodied as any type of circuit or device capable of generating location data indicative of the present location of the mobile communication device 102. For example, the location circuit 240 may be embodied as a Global Positioning System (GPS) circuit. Additionally or alternatively, the location circuit 240 may be embodied as a circuit configured to determine the location of the mobile communication device 102 based on signal trilateration or triangulation. Such location determination may be based on cellular signals, Wi-Fi hotspots, or other signals received by the mobile communication device 102.

In some embodiments, the mobile communication device 102 may further include one or more peripheral devices 250. Such peripheral devices 250 may include any type of peripheral device commonly found in a mobile computing device, for example, a display, a hardware keyboard, input/output devices, peripheral communication devices, and/or other peripheral devices.

Figure 3:
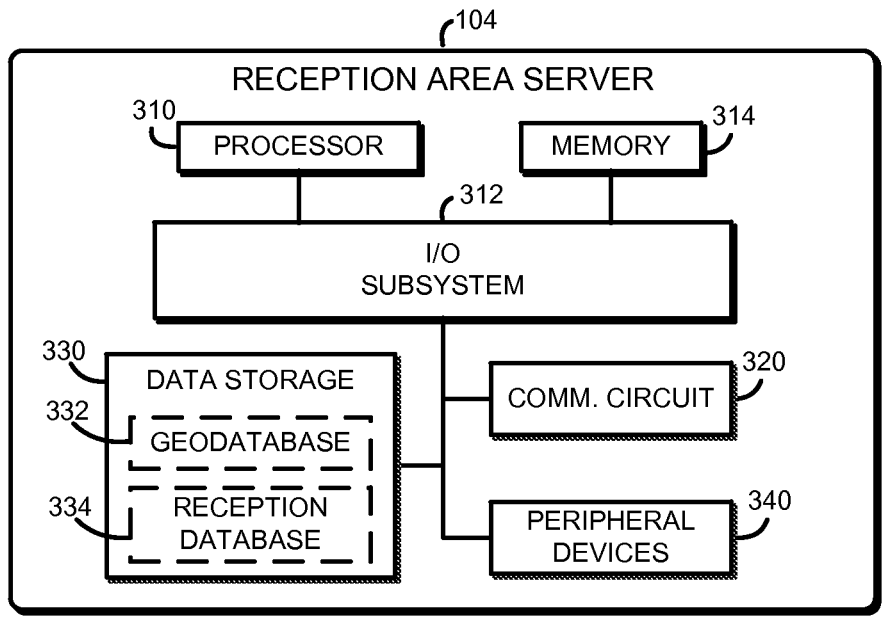
FIG. 3 is a simplified block diagram of at least one embodiment of a reception area server of the system of FIG. 1.

Referring now to FIG. 3, the reception area server 104 may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. In some embodiments, the reception area server 104 may be maintained by a cellular carrier or other wireless communication provider. In other embodiments, the reception area server 104 may be independently maintained. As shown in FIG. 3, the illustrative reception area server 104 includes a processor 310, an I/O subsystem 312, a memory 314, a communication circuit 320, a data storage 330, and peripheral devices 340. The description of the various components of the reception area server 104 is similar to the corresponding components of the mobile communication device 102 and it not repeated herein for clarity of the description. Of course, the mobile communication device 102 may include other or additional components, such as those commonly found in a server (e.g., various input/output devices), in other embodiments.

Referring back to FIG. 1, the additional mobile communication device 106 may be embodied as any type of mobile computing device capable of wireless communication, similar to the mobile communication device 102. For example, the additional mobile communication device 106 may be embodied as or otherwise include, without limitation, a smartphone, a cellular phone, a tablet computer, a notebook computer, a laptop computer, a wearable computer, smart eyeglasses, a smart watch, a head-mounted display unit, a handset, a messaging device, a multiprocessor system, a processor-based system, a consumer electronic device, and/or any other computing device capable of wireless communication. As such, the additional mobile communication device 106 may include components similar to the components of the mobile communication device 102, the description of which is equally applicable to the components of the additional mobile communication device 106. Although the illustrative system 100 includes only a single additional mobile communication device 106 in FIG. 1, it should be appreciated that the system 100 may include any number of additional mobile communication devices 106 in other embodiments.

As discussed above, the mobile communication device 102 is configured to communicate with the reception area server 104 over the network 110. The network 110 may be embodied as any number of various wireless networks. For example, the network 110 may be embodied as, or otherwise include, a cellular network, a wireless local area network (LAN), a wireless wide area network (WAN), and/or a publicly-accessible, global network such as the Internet. As such, the network 110 may include any number of additional devices, such as additional computers, routers, and switches, to facilitate communications among the devices of the system 100.

Figure 4:
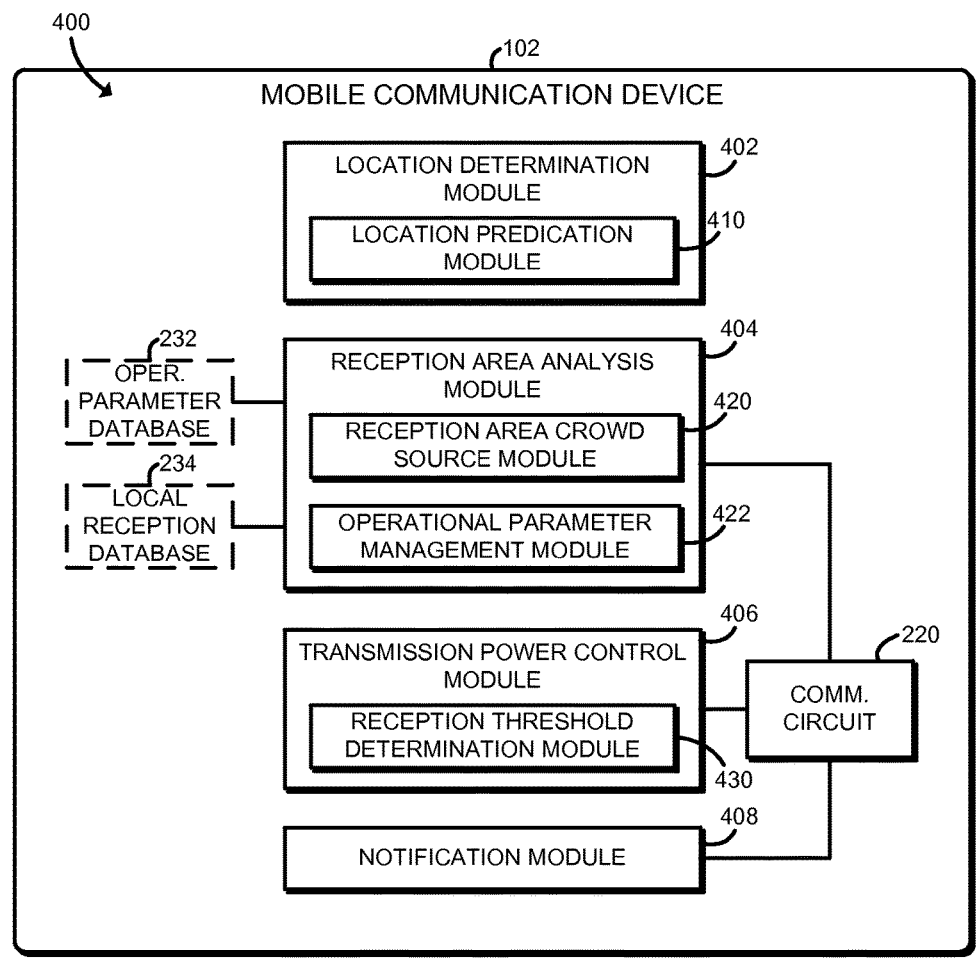
FIG. 4 is a block diagram of at least one embodiment of an environment that may be established by the mobile computing device of the system of FIG. 1.

Referring now to FIG. 4, in use, the mobile communication device 102 may establish an environment 400. The illustrative environment 400 includes a location determination module 402, a reception area analysis module 404, a transmission power control module 406, and a notification module 408. Each of the modules and other components of the environment 400 may be embodied as firmware, software, hardware, or a combination thereof. For example the various modules, logic, and other components of the environment 400 may form a portion of, or otherwise be established by, the processor 210, the I/O subsystem 212, an SoC, or other hardware components of the mobile communication device 102. As such, in some embodiments, any one or more of the modules of the environment 200 may be embodied as a circuit or collection of electrical devices (e.g., a location determination circuit, a reception area analysis circuit, a transmission power control circuit, a notification circuit, etc.).

The location determination module 402 is configured to determine a present location of the mobile communication device 102. To do so, the location determination module 402 may use any suitable mechanism and/or data to determine the present location of the mobile communication device 102. For example, in some embodiments as discussed above, the mobile communication device 102 may include a location determination circuit, such as a GPS circuit, that generates sensor data indicative of the present location of the mobile communication device 102. In other embodiments, the location determination module 402 may be configured to determine or infer the present location of the mobile communication device 102 by trilateration or triangulation of communication signals, such as cellular signals from nearby cellular towers or Wi-Fi signals from nearby hotspots.

The location determination module 402 also includes a location prediction module 410, which is configured to predict a future location of the mobile communication device 102. To do so, the location prediction module 410 may infer the future location based on the present location of the mobile communication device 102 and sensor data indicative of a direction of travel (and, possibly, a speed of travel). Additionally or alternatively, the location prediction module 410 may be configured to predict the future location of the mobile communication device 102 based on historical location information. To do so, the location prediction module 410 may utilize machine learning algorithms to predict the future location based on historical information related to the movement or locations of the mobile communication device 102. For example, location prediction module 410 may learn the behavior and travel routines of the user of the mobile communication device 102 over time (e.g., the user visits the library every Tuesday morning, the user travels a particular road every afternoon, etc.) and use such information to predict the future location of the mobile communication device 102 at a particular time.

The reception area analysis module 404 is configured to determine whether the mobile communication device 102 is likely to enter a low reception area 122 and determine an expected level of reception for any low reception area 122. To do so, the reception area analysis module 404 may obtain reception data from geodatabase 332 or reception database 334 of the reception area server 104 and/or from the local reception database 234 based on the predicted future location. For example, the mobile communication device 102 may transmit data indicative of the predicted future location to the reception area server 104 to determine whether the predicted future location is within a known low reception area 122 and, if so, receive reception data for that low reception area 122 indicative of an expected level of reception. As discussed above, in some embodiments, the reception data may be indexed based on operational parameters of the mobile communication device 102, in addition to the predicted future location. In such embodiments, the mobile communication device 102 may transmit the operational parameters of the mobile communication device 102, along with the predicted future location, to the reception area server 104. Of course, as discussed above, the reception area analysis module 404 may also obtain the reception data from the local reception database 234 based on the predicted future location and the operational parameters.

In some embodiments, the reception area analysis module 404 may include a reception area crowd source module 420. The reception area crowd source module 420 may be configured to transmit reception data for the present location to the reception area server 104 to update the reception area server 104. In this way, the reception area server 104 may generate crowdsourced data indicative of expected levels of reception for various mobile communication devices at various locations. Additionally or alternatively, the reception area crowd source module 420 may be configured to communicate directly with additional mobile communication devices 106 to receive and/or transmits reception data for a particular area.

In some embodiments, the reception area analysis module 404 may further include an operational parameter management module 422. The operational parameter management module 422 is configured to determine and aggregate the various operational parameters of the mobile communication device 102 and utilize such operational parameters to determine the reception data for a predicated future location as discussed above. In some embodiments, the operational parameter management module 422 may automatically detect the operational parameters (e.g., based on sensor data). In other embodiments, the operational parameter management module 422 may provide a user interface to allow a user of the mobile communication device 102 to enter various operational parameter data.

The transmission power control module 406 is configured to control the power of the communication circuit 220. As discussed above, if the mobile communication device 102 is determined to be entering a low reception area 122, the transmission power control module 406 may reduce the transmission power of the communication circuit 220. By reducing the transmission power of the communication circuit 220, the mobile communication device 102 may save energy and reduce unnecessary radiation. In some embodiments, the transmission power control module 406 is configured to interrupt or remove power from the communication circuit 220, or a portion thereof, so as to turn off the communication circuit 220. That is, depending on the implementation, the transmission power control module 406 may reduce the transmission power of the communication circuit 220 by a particular amount or reduce the transmission power all the way to zero by effectively turning off the communication circuit 220. Additionally, as discussed in more detail below, if the mobile communication device 102 is moved back into a non-low reception area (i.e., an area of good reception), the transmission power control module 406 is configured to increase the transmission power of the communication circuit 220. For example, the transmission power control module 406 may turn on the communication circuit 220 in response to a determination that the mobile communication device 102 is no longer in a low reception area.

In some embodiments, the transmission power control module 406 is configured to reduce or turn off the transmission power of the communication circuit 220 in response to the expected level of reception being less than a reference threshold. To do so, the transmission power control module 406 may include a reception threshold determination module 430 configured to determine a reception threshold, below which the transmission power control module 406 will turn off the communication circuit 220 (or otherwise reduce the transmission power thereof). The reception threshold may be pre-defined binary threshold, which may or may not be set or adjusted by the user. In other embodiments, the reception threshold may be dynamically determined by the reception threshold determination module 430 based on, for example, the operational parameters or other conditions or criteria. For example, the reception threshold determination module 430 may decrease the reception threshold in response to detecting that the mobile communication device 102 is being used in an emergency situation. Alternatively, the reception threshold determination module 430 may increase the reception threshold in response to a determination that local environmental conditions are not favorable for communications.

The notification module 408 is configured to generate a notification on the mobile communication device 102 to notify the user that she/he is about to enter a low reception area. Additionally, such notification may further indicate to the user that the mobile communication device 102 will be turning off the communication circuit 220 or otherwise interrupting communications. Such notifications may be visual, audible, and/or tactile notifications.

In some embodiments, the notification module 408 may also be configured to transmit a notification to another mobile communication device with which the mobile communication device 102 is currently communicating to notify the user of that other mobile communication device that the communications will be interrupted. For example, the notification module 408 may detect whether a communication link with another mobile communication device is active and, if so, transmit a notification to the user of the other mobile communication device. In this way, the mobile communication device 102 notifies the user of the mobile communication device 102 if communications are likely to be interrupted or unavailable, allowing the user to take alternative actions (e.g., change course, drive around a low reception area 122, etc.).

Figure 5:
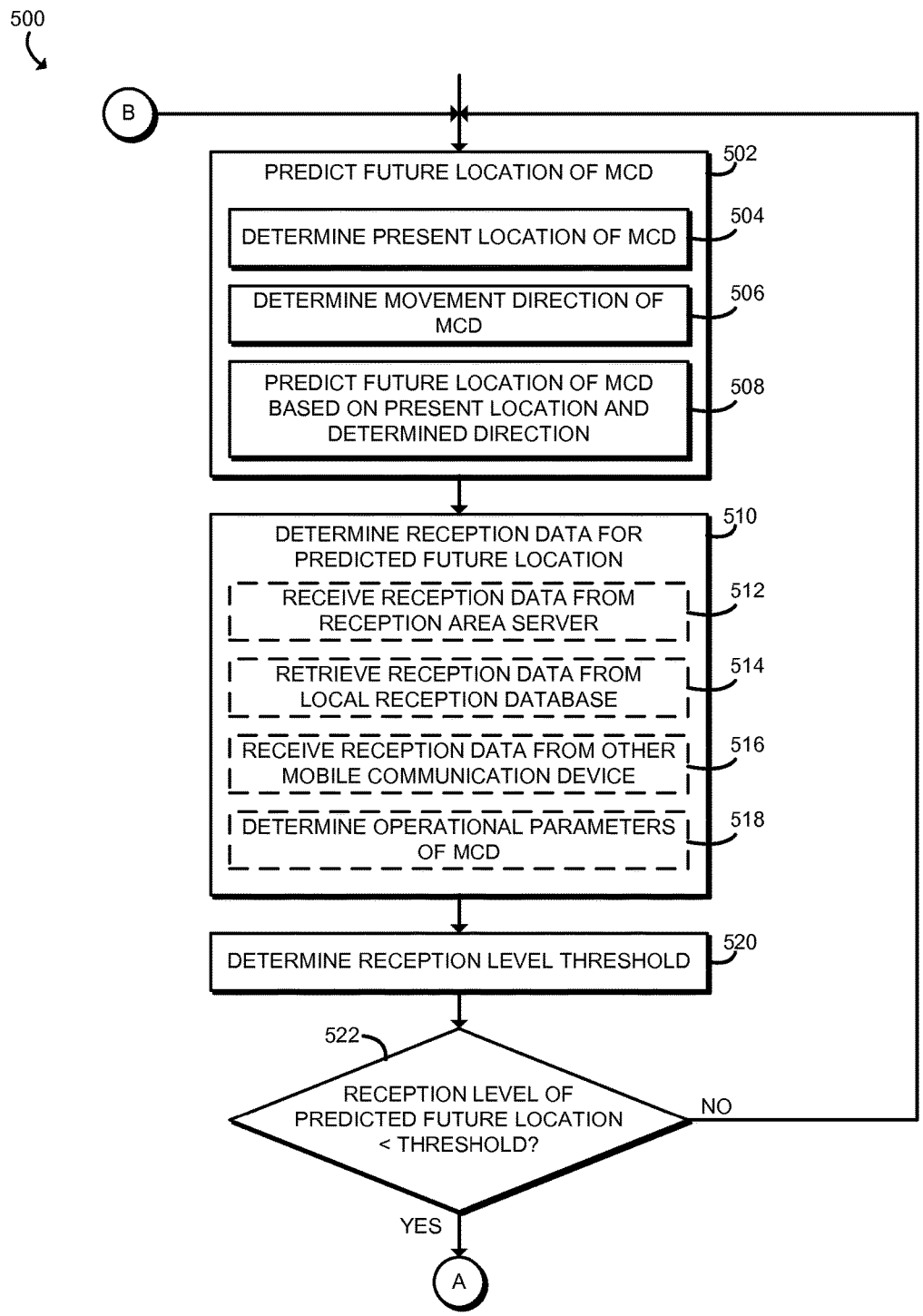
FIGS. 5 and 6 are a simplified flow diagram of at least one embodiment of a method for controlling transmission power of a mobile computing device.
Figure 6:
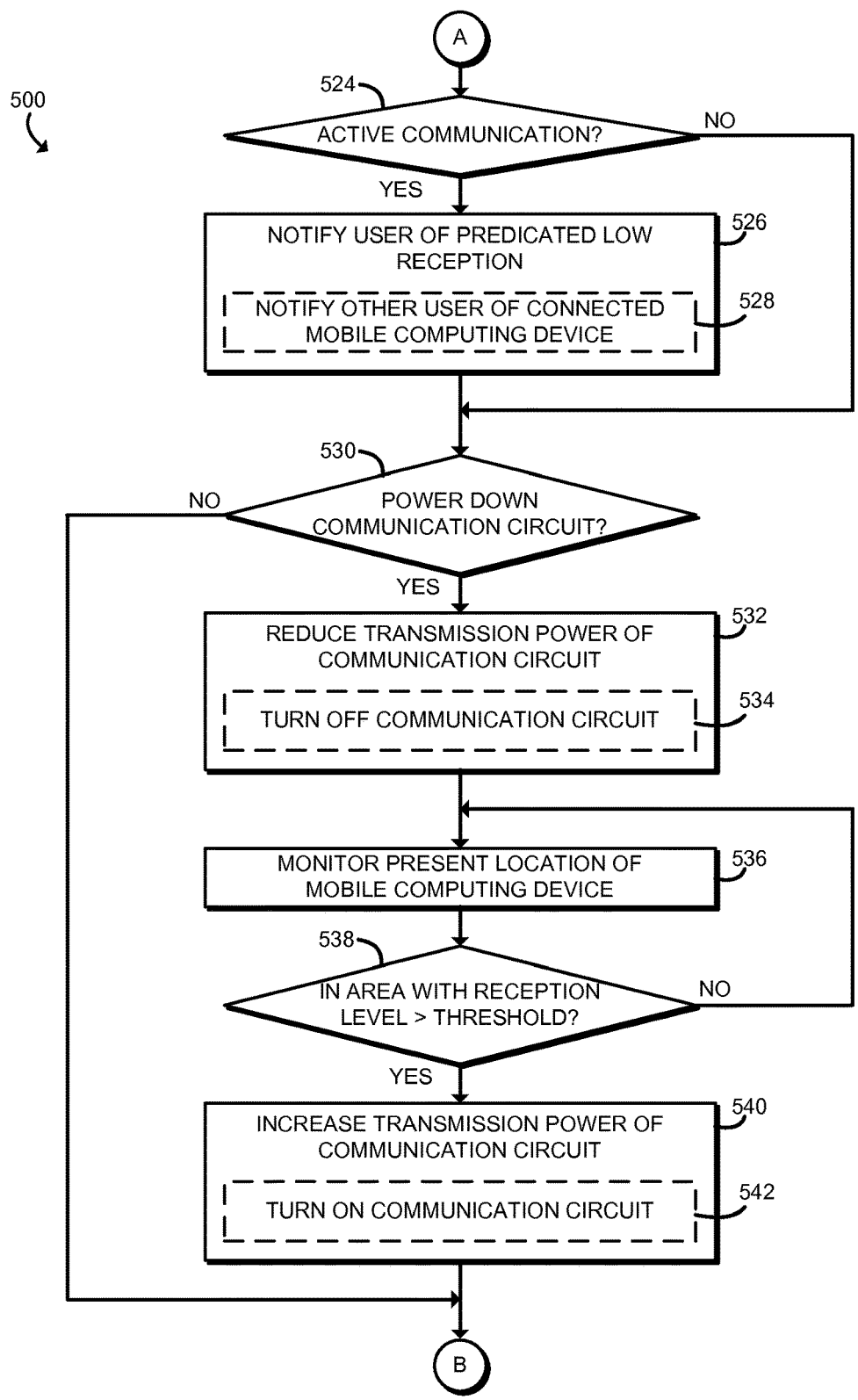

Referring now to FIGS. 5 and 6, in use, the mobile communication device 102 may executed a method 500 for controlling transmission power of the communication circuit 220 of the mobile communication device 102. The method 500 begins with block 502 in which the mobile communication device 102 predicts a future location of the mobile communication device 102. To do so, in block 504, the mobile communication device 102 determines the present location of the mobile communication device 102. As discussed above, the mobile communication device 102 may determine its present location based on location data generated by the location circuit 240 (e.g., based on GPS data). Alternatively, the mobile communication device 102 may determine its present location by performing a triangulation or trilateration analysis based on received signals, such as received cellular signals from multiple cellular towers, received Wi-Fi signals from multiple hotspots, or the like.

In block 506, the mobile communication device 102 may determine a direction of movement of the mobile communication device 102. The direction of movement may be inferred from changes in the present location determined in block 504 or determined based on corresponding sensor data. For example, in some embodiments, the mobile communication device 102 may include various sensors, such as directional sensors, inertia sensors, gyroscope sensors, and the like, that generate data from which the direction of movement of the mobile communication device 102 may be determined. Additionally, in some embodiments, the mobile communication device 102 may determine its speed of travel in block 504.

In block 508, the mobile communication device 102 predicts a future location of the mobile communication device 102 based on the present location determined in block 504 and the movement direction determined in block 506. For example, the mobile communication device 102 may predict the future location at a particular time in the future (e.g., in the next 30 minutes) based on the present location and direction of travel (and, possibly, speed of travel). Further, as discussed above, the mobile communication device 102 may predict its future location based on machine learning and historical information related to the locations and movement of the mobile communication device 102.

After the mobile communication device 102 has determined the predicted future location, the method 500 advances to block 510. In block 510, the mobile communication device 102 determines reception data for the predicted future location. As discussed above, the reception data provides an indication of an expected level of reception for the predicted future location. In some embodiments, the mobile communication device 102 may receive the reception data from the reception area server 104 in block 512. To do so, the mobile communication device 102 may transmit the predicted future location to the reception area server 104 and receive the reception data for the predicted future location therefrom. Alternatively, the mobile communication device 102 may retrieve the reception data for the predicted future location from the local reception database 234. As discussed above, the reception data may be indexed in the local reception database 234 based on the predicted future location. In some embodiments, the mobile communication device 102 may additionally or alternatively receive reception data for the predicted future location from additional mobile communication devices 106. For example, the mobile communication device 102 may transmit or broadcast the predicted future location to the additional mobile communication device 106 and receive the reception data for the predicted future location from the additional mobile communication device 106 in response. The reception data received from the additional mobile communication device 106 may be based on sensed levels of reception by the additional mobile communication device 106 while in the predicted future location as discussed above.

In some embodiments, the mobile communication device 102 may also be configured to determine operational parameters of the mobile communication device 102 in block 518. As discussed above, some of the operational parameters may be embodied as static parameters (e.g., device type, device identifier, etc.). Such static operational parameters may be stored in, and retrieved from, the operational parameter database 232. Other operational parameters may be embodied as dynamic parameters (e.g., environmental conditions, battery level, etc.). Such dynamic parameters may be determined periodically or as needed by the operational parameter management module 422 as discussed above. Regardless, it should be appreciated that the mobile communication device 102 may utilize the operational parameters as additional criteria, in addition to the predicted future location, for determining or obtaining the reception data. For example, the mobile communication device 102 may receive the reception data from the reception area server 104 in block 512 based on the predicted future location and the operational parameters, may retrieve the reception data from the local reception database 234 based on the predicted future location and the operational parameters, and/or receive the reception data from additional mobile communication devices 106 based on the predicted future location and the operational parameters.

After the mobile communication device 102 has determined the reception data for the predicted future location, the method 500 advances to block 520. In block 520, the mobile communication device 102 determines the reception level threshold. As discussed above the reception level threshold, which dictates whether the communication circuit 220 will be turned off in a particular low reception area 122, may be a pre-defined, fixed, binary value in some embodiments. In such embodiments, the same reception level threshold may be applicable to every low reception area 122, and the mobile communication device 102 may simply retrieve the reception level threshold from storage in block 520. However, in other embodiments, the reception level threshold may be dynamically determined in block 520. For example, the reception level threshold may be embodied as a multi-tiered threshold, which may be different for different low reception areas 122. Additionally or alternatively, the reception level threshold may be dependent on the operational parameters of the mobile communication device 102 or other conditions or criteria. For example, the mobile communication device 102 may determine a higher reception level threshold in block 520 if the mobile communication device 102 is currently being used in an emergency situation.

After the mobile communication device 102 determines the reception level threshold in block 520, the method 500 advances to block 522. In block 522, the mobile communication device 102 determines whether the reception level of the predicted future location, as indicated by the reception data determined in block 510, is less than the reception level threshold determined in block 520. If not, mobile communication device 102 determines that the expected reception level of the predicted future location is sufficient enough to maintain communications, and the method 500 loops back to block 502 in which the mobile communication device predicts a new future location. However, if the expected reception level of the predicted future location is less than the reception level threshold, the method 500 advances to block 524 of FIG. 6.

In block 524, the mobile communication device 102 determines whether the mobile communication device 102 is involved in an active communication. For example, the mobile communication device 102 may determine whether an active communication link is established with another mobile communication device. Depending on the particular type of mobile communication device 102, the active communication may be embodied as a voice communication (e.g., a cellular call) or a data communication (e.g., a text conversation). If the mobile communication device 102 is not presently involved in an active communication, the method 500 advances to block 530 discussed below.

If, however, the mobile communication device 102 is presently involved in an active communication, the method 500 advances to block 526. In block 526, the mobile communication device 102 notifies the user of the predicted low reception at the predicted future location. To do so, the mobile communication device 102 may generate a visual, audible, and/or tactical notification to alert the user that the predicted future location has a low reception and/or that the transmission power of the communication circuit 220 will be reduced or the communication circuit 220 will otherwise be turned off. Additionally, in some embodiments, the mobile communication device 102 may also transmit a similar notification to a user of the other mobile communication device with which the mobile communication device 102 has the active communication. In this way, both parties of the active communication are notified that current active communication will be terminated upon entering the low reception area.

After the user(s) have been notified in block 526 or if there is presently no active communication, the method 500 advances to block 530. In block 530, the mobile communication device 102 determines whether to power down the communication circuit 220. In some embodiments, the mobile communication device 102 may be configured to automatically power down or turn off the communication circuit 220 in response to a determination that the expected reception level of the predicted future location is less than the reception level threshold in block 522. However, in other embodiments, the mobile communication device 102 may first seek approval from the user prior to reducing the transmission power and/or turning off the communication circuit 220. For example, in some embodiments, the mobile communication device 102 may prompt the user for confirmation to turn off the communication circuit 220 in block 530 to allow the user the opportunity to finish a conversation or other communication and/or take some other remedial action (e.g., change her/his direction of travel).

If the mobile communication device 102 determines that the communication circuit 220 is to be powered down in block 530, the method 500 advances to block 532. In block 532, the mobile communication device 102 reduces the transmission power of the communication circuit 220. The mobile communication device 102 may reduce the transmission power by any suitable amount, including fully turning off the transmission power. For example, in block 534, the mobile communication device 102 may turn off the communication circuit 220 by removing or interrupting power to the communication circuit 220.

After the transmission power of the communication circuit has been reduced and/or the communication circuit 220 has otherwise been turned off, the method 500 advances to block 536. In block 536, the mobile communication device 102 monitors or determines its present location. As discussed above, the mobile communication device 102 may determine its present location based on location data generated by the location circuit 240 and/or other data (e.g., by performing a triangulation or trilateration analysis based on received signals). Subsequently, in block 538, the mobile communication device 102 determines whether the mobile communication device 102 is in an area having a reception level that is greater than the reception level threshold (e.g., by accessing the reception area server 104 or the local reception database 234). If not, the method 500 loops back to block 536 in which the mobile communication device 102 continues to monitor its present location.

If, however, the mobile communication device 102 determines that it is no longer in a low reception area 122, the method 500 advances to block 540 in which the mobile communication device 102 increases the transmission power of the communication circuit 220. For example, in block 542, the mobile communication device 102 may turn on the communication circuit 220 if it was previously turned off in block 534. The method subsequently advances to block 502 of FIG. 5 in which the mobile communication device 102 continues to predict a future location. In this way, the mobile communication device 102 may conserve power, increase battery life, and reduce ionizing radiation by reducing or turning off the transmission power of the communication circuit 220 in areas of low reception.

EXAMPLES

Illustrative examples of the devices, systems, and methods disclosed herein are provided below. An embodiment of the devices, systems, and methods may include any one or more, and any combination of, the examples described below.

Example 1 includes a mobile communication device for controlling transmission power of a communication circuit, the mobile communication device comprising a communication circuit; a location determination module to predict a future location of the mobile communication device; a reception area analysis module to determine reception data for the predicted future location, wherein the reception data is indicative of an expected level of reception by the mobile communication device while in the future location; and a transmission power control module to reduce transmission power of the communication circuit while the mobile communication device is in the predicted future location in response to the expected level of reception being less than a reference threshold.

Example 2 includes the subject matter of Example 1, and wherein to reduce the transmission power of the communication circuit comprises to turn off the communication circuit.

Example 3 includes the subject matter of any of Examples 1 and 2, and wherein to turn off the transmission power of the communication circuit comprises to remove a source power from the communication circuit.

Example 4 includes the subject matter of any of Examples 1-3, and further including a notification module to (i) determine whether the mobile communication device has an active communication link with another mobile communication device and (ii) generate a notification to a user of the mobile communication device that informs the user that the transmission power of the communication circuit will be reduced.

Example 5 includes the subject matter of any of Examples 1-4, and wherein the notification module is further to transmit a notification to the another mobile communication device that the active communication link will be terminated.

Example 6 includes the subject matter of any of Examples 1-5, and wherein the transmission power control module is further to compare the expected level of reception to the reference threshold, wherein the reference threshold is a static threshold.

Example 7 includes the subject matter of any of Examples 1-6, and wherein the transmission power control module is further to (i) receive threshold data from a user of the mobile communication device and (ii) set the reference threshold to the threshold data.

Example 8 includes the subject matter of any of Examples 1-7, and wherein the transmission power control module is further to determine the reference threshold based on at least one operational parameter of the mobile communication device, wherein the at least one operational parameter is indicative of an operational characteristic of the mobile communication device.

Example 9 includes the subject matter of any of Examples 1-8, and wherein the location determination module is further to determine a present location of the mobile communication device subsequent to the reduction of the transmission power of the communication circuit; and the transmission power control module is to increase the transmission power of the communication circuit in response to determining that present location is different from the predicted future location.

Example 10 includes the subject matter of any of Examples 1-9, and wherein to increase the transmission power of the communication circuit comprises to turn on the communication circuit.

Example 11 includes the subject matter of any of Examples 1-10, and wherein the reception area analysis module is to determine additional reception data for the present location, wherein the additional reception data is indicative of a level of reception by the mobile communication device while in the present location, and the transmission power control module is to increase the transmission power of the communication circuit in response to the additional reception data being greater than the reference threshold.

Example 12 includes the subject matter of any of Examples 1-11, and wherein the location determination module is to generate location data indicative of a present location of the mobile communication device; determine a direction of movement of the mobile communication device based on the location data; and determine the predicted future location based on the present location of the mobile communication device and the determined direction of movement of the mobile communication device.

Example 13 includes the subject matter of any of Examples 1-12, and wherein to determine the reception data for the predicted future location comprises to determine operational parameters of the mobile communication device; and determine the reception data for the predicted future location based on the operational parameters.

Example 14 includes the subject matter of any of Examples 1-13, and wherein the operational parameters include at least one of an altitude of the mobile communication device, an identifier associated with the mobile communication device, an identity of a communication service provider used by the mobile communication device, a communication protocol used by the mobile communication device, a communication service package associated with the mobile communication device and provided by a communication service provider, a device type of the mobile communication device, an antenna type of an antenna of a communication circuit of the mobile communication device, a number of other mobile communication device within a reference distance of the mobile communication device, or environmental conditions.

Example 15 includes the subject matter of any of Examples 1-14, and wherein to determine the reception data for the predicted future location comprises to transmit the predicted future location and the operational parameters to a reception area server; and receive the reception data from the reception area server in response to the transmission of the predicted future location and the operational parameters.

Example 16 includes the subject matter of any of Examples 1-15, and wherein to determine the reception data for the predicted future location comprises to retrieve the reception data from a local reception database stored on the mobile communication device based on the predicted future location and the operational parameters.

Example 17 includes the subject matter of any of Examples 1-16, and wherein to determine the reception data for the predicted future location comprises to receive the reception data from another mobile communication device based on the predicted future location and the operational parameters.

Example 18 includes the subject matter of any of Examples 1-17, and wherein to determine the reception data for the predicted future location comprises to transmit the predicted future location to a reception area server; and receive the reception data from the reception area server in response to the transmission of the predicted future location.

Example 19 includes the subject matter of any of Examples 1-18, and wherein to determine the reception data for the predicted future location comprises to retrieve the reception data from a local reception database stored on the mobile communication device based on the predicted future location.

Example 20 includes the subject matter of any of Examples 1-19, and, wherein to determine reception data for the predicted future location comprises to receive the reception data from another mobile communication device based on the predicted future location.

Example 21 includes the subject matter of any of Examples 1-20, and wherein reception area analysis module is further to transmit the predicted future location to the another mobile communication device.

Example 22 includes a method for controlling transmission power of a mobile communication device, the method comprising predicting, by the mobile communication device, a future location of the mobile communication device; determining, by the mobile communication device, reception data for the predicted future location, wherein the reception data is indicative of an expected level of reception by the mobile communication device while in the future location; and reducing, by the mobile communication device, transmission power of a communication circuit of the mobile communication device while the mobile communication device is in the predicted future location in response to the expected level of reception being less than a reference threshold.

Example 23 includes the subject matter of Example 22, and wherein reducing the transmission power of the communication circuit comprises turning off the communication circuit.

Example 24 includes the subject matter of any of Examples 22 and 23, and wherein turning off the transmission power of the communication circuit comprises removing a source power from the communication circuit.

Example 25 includes the subject matter of any of Examples 22-24, and further including determining, by the mobile communication device, whether the mobile communication device has an active communication link with another mobile communication device; and generating, by the mobile communication device, a notification to a user of the mobile communication device that informs the user that the transmission power of the communication circuit will be reduced.

Example 26 includes the subject matter of any of Examples 22-25, and further including transmitting, by the mobile communication device, a notification to the another mobile communication device that the active communication link will be terminated.

Example 27 includes the subject matter of any of Examples 22-26, and further including, by the mobile communication device, the expected level of reception to the reference threshold, wherein the reference threshold is a static threshold.

Example 28 includes the subject matter of any of Examples 22-27, and further including receiving, by the mobile communication device, threshold data from a user of the mobile communication device; and setting, by the mobile communication device, the reference threshold to the threshold data.

Example 29 includes the subject matter of any of Examples 22-28, and further including determining, by the mobile communication device, the reference threshold based on at least one operational parameter of the mobile communication device, wherein the at least one operational parameter is indicative of an operational characteristic of the mobile communication device.

Example 30 includes the subject matter of any of Examples 22-29, and further including determining, by the mobile communication device, a present location of the mobile communication device subsequent to reducing the transmission power of the communication circuit; and increasing, by the mobile communication device, the transmission power of the communication circuit in response to determining that present location is different from the predicted future location.

Example 31 includes the subject matter of any of Examples 22-30, and wherein increasing the transmission power of the communication circuit comprises turning on the communication circuit.

Example 32 includes the subject matter of any of Examples 22-31, and further including determining, by the mobile communication device, additional reception data for the present location, wherein the additional reception data is indicative of a level of reception by the mobile communication device while in the present location, and wherein increasing the transmission power comprises increasing, by the mobile communication device, the transmission power of the communication circuit in response to the additional reception data being greater than the reference threshold.

Example 33 includes the subject matter of any of Examples 22-32, and wherein predicting the future location of the mobile computing device comprises generating, by the mobile communication device, location data indicative of a present location of the mobile communication device; determining, by the mobile communication device, a direction of movement of the mobile communication device based on the location data; and determining, by the mobile communication device, the predicted future location based on the present location of the mobile communication device and the determined direction of movement of the mobile communication device.

Example 34 includes the subject matter of any of Examples 22-33, and wherein determining the reception data for the predicted future location comprises determining, by the mobile communication device, operational parameters of the mobile communication device; and determining, by the mobile communication device, the reception data for the predicted future location based on the operational parameters.

Example 35 includes the subject matter of any of Examples 22-34, and wherein the operational parameters include at least one of an altitude of the mobile communication device, an identifier associated with the mobile communication device, an identity of a communication service provider used by the mobile communication device, a communication protocol used by the mobile communication device, a communication service package associated with the mobile communication device and provided by a communication service provider, a device type of the mobile communication device, an antenna type of an antenna of a communication circuit of the mobile communication device, a number of other mobile communication device within a reference distance of the mobile communication device, or environmental conditions.

Example 36 includes the subject matter of any of Examples 22-35, and wherein determining the reception data for the predicted future location comprises transmitting, by the mobile communication device, the predicted future location and the operational parameters to a reception area server; and receiving, by the mobile communication device, the reception data from the reception area server in response to the transmission of the predicted future location and the operational parameters.

Example 37 includes the subject matter of any of Examples 22-36, and wherein determining the reception data for the predicted future location comprises retrieving, by the mobile communication device, the reception data from a local reception database stored on the mobile communication device based on the predicted future location and the operational parameters.

Example 38 includes the subject matter of any of Examples 22-37, and wherein determining the reception data for the predicted future location comprises receiving, by the mobile communication device, the reception data from another mobile communication device based on the predicted future location and the operational parameters.

Example 39 includes the subject matter of any of Examples 22-38, and wherein determining the reception data for the predicted future location comprises transmitting, by the mobile communication device, the predicted future location to a reception area server; and receiving, by the mobile communication device, the reception data from the reception area server in response to the transmission of the predicted future location.

Example 40 includes the subject matter of any of Examples 22-39, and wherein determining the reception data for the predicted future location comprises retrieving, by the mobile communication device, the reception data from a local reception database stored on the mobile communication device based on the predicted future location.

Example 41 includes the subject matter of any of Examples 22-40, and wherein determining reception data for the predicted future location comprises receiving, by the mobile communication device, the reception data from another mobile communication device based on the predicted future location.

Example 42 includes the subject matter of any of Examples 22-41, and further including transmitting the predicted future location to the another mobile communication device.

Example 43 includes one or more computer-readable storage media comprising a plurality of instructions stored thereon that, in response to execution, cause a mobile communication device to perform the method of any of Examples 22-42.

Example 44 includes a mobile communication device for controlling transmission power of a communication circuit, the mobile communication device comprising means means for predicting a future location of the mobile communication device; means for determining reception data for the predicted future location, wherein the reception data is indicative of an expected level of reception by the mobile communication device while in the future location; and means for reducing, by the mobile communication device, transmission power of a communication circuit of the mobile communication device while the mobile communication device is in the predicted future location in response to the expected level of reception being less than a reference threshold.

Example 45 includes the subject matter of Example 44, and wherein the means for reducing the transmission power of the communication circuit comprises means for turning off the communication circuit.

Example 46 includes the subject matter of any of Examples 44 and 45, and wherein the means for turning off the transmission power of the communication circuit comprises means for removing a source power from the communication circuit.

Example 47 includes the subject matter of any of Examples 44-46, and further including means for determining whether the mobile communication device has an active communication link with another mobile communication device; and means for generating a notification to a user of the mobile communication device that informs the user that the transmission power of the communication circuit will be reduced.

Example 48 includes the subject matter of any of Examples 44-47, and further including means for transmitting a notification to the another mobile communication device that the active communication link will be terminated.

Example 49 includes the subject matter of any of Examples 44-48, and further including means for comparing the expected level of reception to the reference threshold, wherein the reference threshold is a static threshold.

Example 50 includes the subject matter of any of Examples 44-49, and further including means for receiving threshold data from a user of the mobile communication device; and means for setting the reference threshold to the threshold data.

Example 51 includes the subject matter of any of Examples 44-50, and further including means for determining the reference threshold based on at least one operational parameter of the mobile communication device, wherein the at least one operational parameter is indicative of an operational characteristic of the mobile communication device.

Example 52 includes the subject matter of any of Examples 44-51, and further including means for determining a present location of the mobile communication device subsequent to reducing the transmission power of the communication circuit; and means for increasing the transmission power of the communication circuit in response to determining that present location is different from the predicted future location.

Example 53 includes the subject matter of any of Examples 44-52, and wherein the means for increasing the transmission power of the communication circuit comprises means for turning on the communication circuit.

Example 54 includes the subject matter of any of Examples 44-53 and further including means for determining additional reception data for the present location, wherein the additional reception data is indicative of a level of reception by the mobile communication device while in the present location, and wherein the means for increasing the transmission power comprises means for increasing the transmission power of the communication circuit in response to the additional reception data being greater than the reference threshold.

Example 55 includes the subject matter of any of Examples 44-54, and wherein the means for predicting the future location of the mobile computing device comprises means for generating location data indicative of a present location of the mobile communication device; means for determining a direction of movement of the mobile communication device based on the location data; and means for determining the predicted future location based on the present location of the mobile communication device and the determined direction of movement of the mobile communication device.

Example 56 includes the subject matter of any of Examples 44-55, and wherein the means for determining the reception data for the predicted future location comprises means for determining operational parameters of the mobile communication device; and means for determining the reception data for the predicted future location based on the operational parameters.

Example 57 includes the subject matter of any of Examples 44-56, and wherein the operational parameters include at least one of an altitude of the mobile communication device, an identifier associated with the mobile communication device, an identity of a communication service provider used by the mobile communication device, a communication protocol used by the mobile communication device, a communication service package associated with the mobile communication device and provided by a communication service provider, a device type of the mobile communication device, an antenna type of an antenna of a communication circuit of the mobile communication device, a number of other mobile communication device within a reference distance of the mobile communication device, or environmental conditions.

Example 58 includes the subject matter of any of Examples 44-57, and wherein the means for determining the reception data for the predicted future location comprises means for transmitting the predicted future location and the operational parameters to a reception area server; and means for receiving the reception data from the reception area server in response to the transmission of the predicted future location and the operational parameters.

Example 59 includes the subject matter of any of Examples 44-58, and wherein the means for determining the reception data for the predicted future location comprises means for retrieving the reception data from a local reception database stored on the mobile communication device based on the predicted future location and the operational parameters.

Example 60 includes the subject matter of any of Examples 44-59, and wherein the means for determining the reception data for the predicted future location comprises means for receiving the reception data from another mobile communication device based on the predicted future location and the operational parameters.

Example 61 includes the subject matter of any of Examples 44-60, and wherein the means for determining the reception data for the predicted future location comprises means for transmitting the predicted future location to a reception area server; and means for receiving the reception data from the reception area server in response to the transmission of the predicted future location.

Example 62 includes the subject matter of any of Examples 44-61, and wherein the means for determining the reception data for the predicted future location comprises means for retrieving the reception data from a local reception database stored on the mobile communication device based on the predicted future location.

Example 63 includes the subject matter of any of Examples 44-62, and wherein the means for determining reception data for the predicted future location comprises means for receiving the reception data from another mobile communication device based on the predicted future location.

Example 64 includes the subject matter of any of Examples 44-63, and further including means for comprising transmitting the predicted future location to the another mobile communication device.

The invention claimed is:

1. A mobile communication device for controlling transmission power of a communication circuit, the mobile communication device comprising:
   a communication circuit;
   a location determination module to predict a future location of the mobile communication device;
   a reception area analysis module to determine reception data for the predicted future location, wherein the reception data is indicative of an expected level of reception by the mobile communication device while in the future location; and
   a transmission power control module to reduce transmission power of the communication circuit while the mobile communication device is in the predicted future location in response to the expected level of reception being less than a reference threshold;
   wherein the location determination module is further to determine a present location of the mobile communication device subsequent to the reduction of the transmission power of the communication circuit and the transmission power control module is further to increase the transmission power of the communication circuit in response to a determination that the present location of the mobile communication device is different from the predicted future location.

2. The mobile communication device of claim 1, wherein to reduce the transmission power of the communication circuit comprises to turn off the communication circuit.

3. The mobile communication device of claim 2, wherein to turn off the transmission power of the communication circuit comprises to remove a source power from the communication circuit.

4. The mobile communication device of claim 1, further comprising a notification module to (i) determine whether the mobile communication device has an active communication link with another mobile communication device and (ii) generate a notification to a user of the mobile communication device that informs the user that the transmission power of the communication circuit will be reduced.

5. The mobile communication device of claim 4, wherein the notification module is further to transmit a notification to the another mobile communication device that the active communication link will be terminated.

6. The mobile communication device of claim 1, wherein to increase the transmission power of the communication circuit comprises to turn on the communication circuit.

7. The mobile communication device of claim 1, wherein the location determination module is to:
   generate location data indicative of a present location of the mobile communication device;
   determine a direction of movement of the mobile communication device based on the location data; and
   determine the predicted future location based on the present location of the mobile communication device and the determined direction of movement of the mobile communication device.

8. The mobile communication device of claim 1, wherein to determine the reception data for the predicted future location comprises to:
   determine operational parameters of the mobile communication device; and
   determine the reception data for the predicted future location based on the operational parameters.

9. One or more non-transitory, computer-readable storage media comprising a plurality of instructions stored thereon that, in response to execution, cause a mobile communication device to:

predict a future location of the mobile communication device;

determine reception data for the predicted future location, wherein the reception data is indicative of an expected level of reception by the mobile communication device while in the future location;

reduce transmission power of a communication circuit of the mobile communication device while the mobile communication device is in the predicted future location in response to the expected level of reception being less than a reference threshold;

determine a present location of the mobile communication device subsequent to reducing the transmission power of the communication circuit; and increase the transmission power of the communication circuit in response to determining that present location is different from the predicted future location.

10. The one or more non-transitory, computer-readable storage media of claim 9, wherein to reduce the transmission power of the communication circuit comprises to turn off the communication circuit.

11. The one or more non-transitory, computer-readable storage media of claim 10, wherein to turn off the transmission power of the communication circuit comprises to remove a source power from the communication circuit.

12. The one or more non-transitory, computer-readable storage media of claim 9, wherein the plurality of instructions, in response to execution, further cause the mobile communication device to:

determine whether the mobile communication device has an active communication link with another mobile communication device; and generate a notification to a user of the mobile communication device that informs the user that the transmission power of the communication circuit will be reduced.

13. The one or more non-transitory, computer-readable storage media of claim 12, wherein the plurality of instructions, in response to execution, further cause the mobile communication device to transmit a notification to the another mobile communication device that the active communication link will be terminated.

14. The one or more non-transitory, computer-readable storage media of claim 9, wherein to predict the future location of the mobile computing device comprises to:

generate location data indicative of a present location of the mobile communication device;

determine a direction of movement of the mobile communication device based on the location data; and determine the predicted future location based on the present location of the mobile communication device and the determined direction of movement of the mobile communication device.

15. The one or more non-transitory, computer-readable storage media of claim 9, wherein to determine the reception data for the predicted future location comprises to:

determine operational parameters of the mobile communication device; and determine the reception data for the predicted future location based on the operational parameters.

16. A method for controlling transmission power of a mobile communication device, the method comprising:

predicting, by the mobile communication device, a future location of the mobile communication device;

determining, by the mobile communication device, reception data for the predicted future location, wherein the reception data is indicative of an expected level of reception by the mobile communication device while in the future location;

reducing, by the mobile communication device, transmission power of a communication circuit of the mobile communication device while the mobile communication device is in the predicted future location in response to the expected level of reception being less than a reference threshold;

determining, by the mobile communication device, a present location of the mobile communication device subsequent to reducing the transmission power of the communication circuit; and increasing, by the mobile communication device, the transmission power of the communication circuit in response to determining that present location is different from the predicted future location.

17. The method of claim 16, wherein reducing the transmission power of the communication circuit comprises turning off the communication circuit.

18. The method of claim 17, wherein turning off the transmission power of the communication circuit comprises removing a source power from the communication circuit.

19. The method of claim 16, further comprising:

determining, by the mobile communication device, whether the mobile communication device has an active communication link with another mobile communication device; and generating, by the mobile communication device, a notification to a user of the mobile communication device that informs the user that the transmission power of the communication circuit will be reduced.

20. The method of claim 19, further comprising transmitting, by the mobile communication device, a notification to the another mobile communication device that the active communication link will be terminated.

21. The method of claim 16, wherein predicting the future location of the mobile computing device comprises:

generating, by the mobile communication device, location data indicative of a present location of the mobile communication device;

determining, by the mobile communication device, a direction of movement of the mobile communication device based on the location data; and determining, by the mobile communication device, the predicted future location based on the present location of the mobile communication device and the determined direction of movement of the mobile communication device.

22. The method of claim 16, wherein determining the reception data for the predicted future location comprises:

determining, by the mobile communication device, operational parameters of the mobile communication device; and determining, by the mobile communication device, the reception data for the predicted future location based on the operational parameters.

* * * * *